Figure 1:
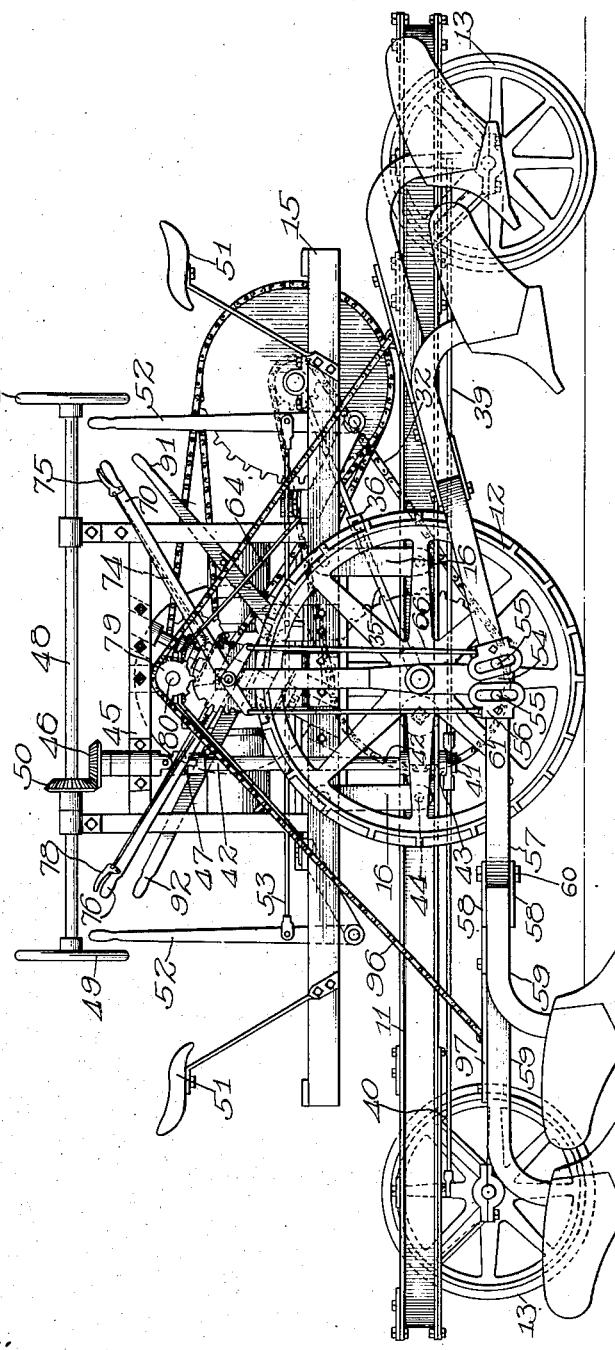

E. T. McKAIG.
MOTOR PLOW.
APPLICATION FILED FEB. 1, 1911.

1,126,054.

Patented Jan. 26, 1915.
4 SHEETS—SHEET 1.

E. T. McKAIG.
MOTOR PLOW.
APPLICATION FILED FEB. 1, 1911.

1,126,054.

Patented Jan. 26, 1915.
4 SHEETS—SHEET 2.

Witnesses:
G. O. Domarus Jr.
K. W. Wornell.

Inventor:
Eddy T. McKaig.
By Brown & Hopkins
Attys.

E. T. McKAIG.
MOTOR PLOW.
APPLICATION FILED FEB. 1, 1911.
1,126,054.
Patented Jan. 26, 1915.
4 SHEETS—SHEET 3.
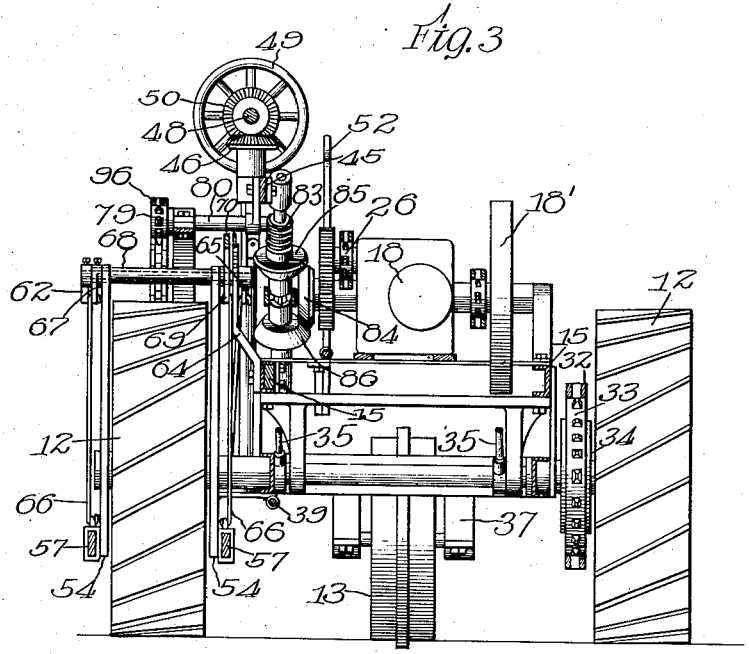
Fig. 3.
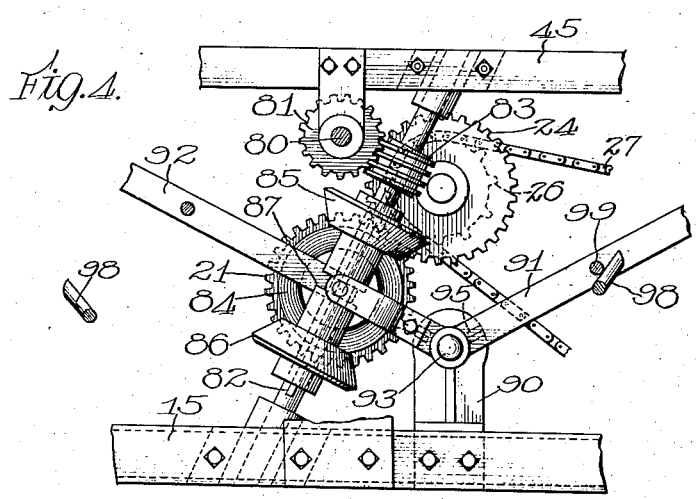
Fig. 4.
Fig. 5.
Witnesses:
Inventor.
Eddy T. McKaig.

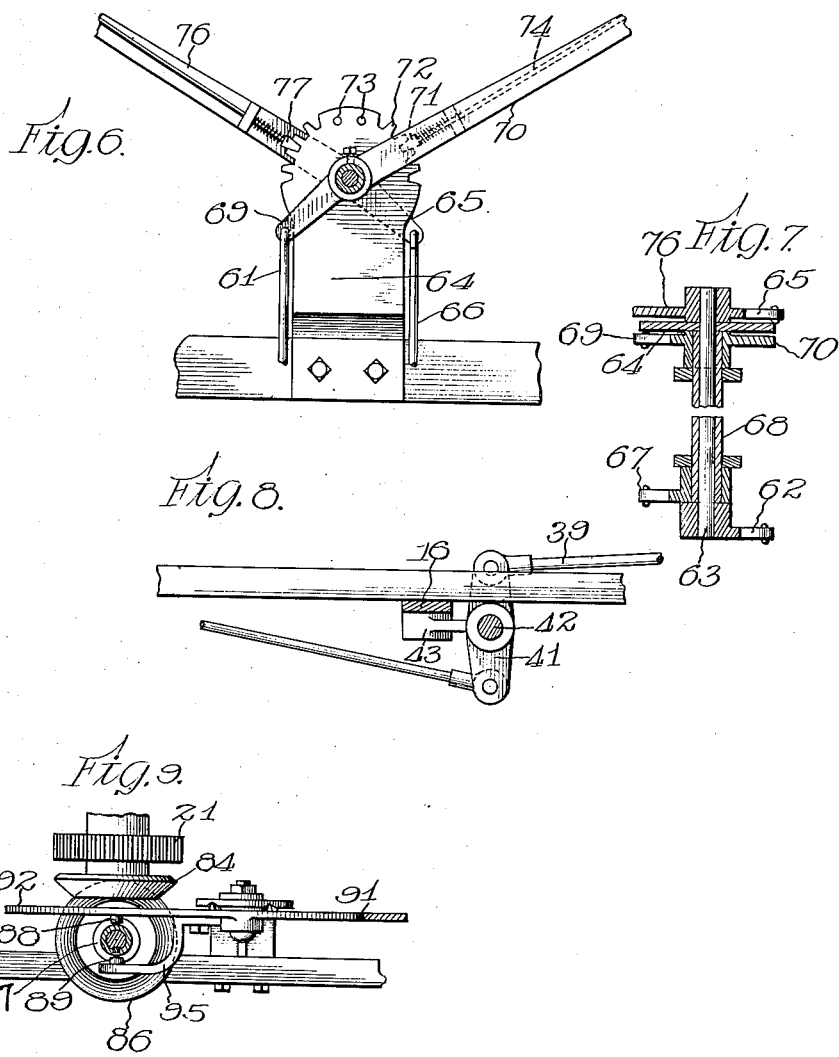

UNITED STATES PATENT OFFICE.

EDDY T. McKAIG, OF CHICAGO, ILLINOIS, ASSIGNOR OF ONE-HALF TO HARRY G. HASCALL, OF CHICAGO, ILLINOIS.

MOTOR-PLOW.

1,126,054.   Specification of Letters Patent.   Patented Jan. 26, 1915.

Application filed February 1, 1911. Serial No. 605,922.

*To all whom it may concern:*

Be it known that I, EDDY T. McKAIG, a citizen of the United States, and resident of Chicago, in the county of Cook and State of Illinois, have made a new and useful Improvement in Motor-Plows, of which the following is a specification.

This invention relates to an agricultural implement commonly known as a motor plow and the present embodiment presents the following principal or main objects: to provide means for raising or lowering plows; to regulate the depth of the furrow turned by the plows, either when the vehicle is in motion or from a stationary position; to allow the plows to swing laterally in accordance with the lateral movement of the vehicle to position the plows directly behind one of the drive wheels; to provide an improved steering apparatus whereby the vehicle may be directed from either end thereof; to provide means for obviating a varying depth of furrow caused by the unevenness of the ground; to dispose the pilot wheels and the drive wheels so that they will all be on solid ground when the vehicle is in motion; and to provide means whereby it is unnecessary to turn the vehicle around when it is desired to plow in the other direction.

To the attainment of these ends and the accomplishment of other new and useful objects, as will appear, the invention consists in the features of novelty in the construction, combination and arrangement of the several parts hereinafter more fully set forth in the specification, claimed in the appended claims and illustrated in the drawings, in the latter of which—

Figure 2:
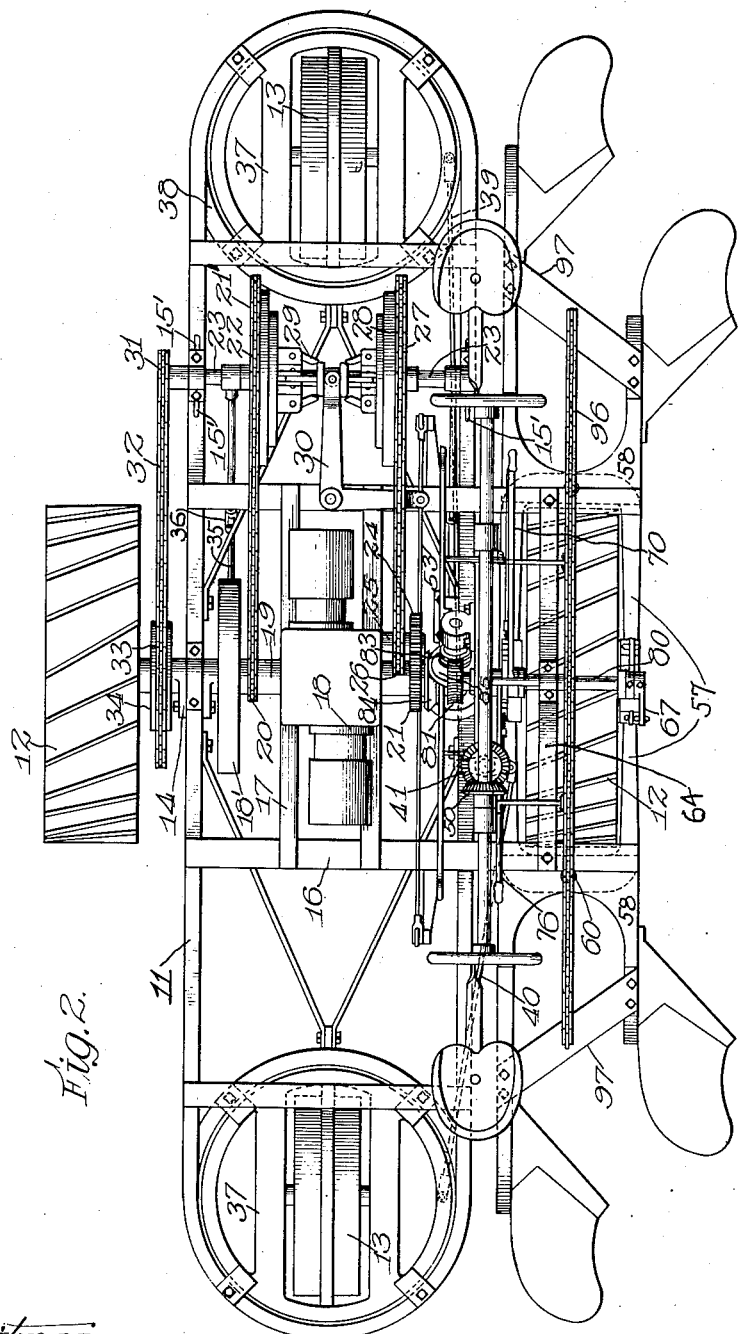

Figure 1 is a side view of the preferred embodiment of my invention. Fig. 2 is a plan view of the same. Fig. 3 is an end view. Fig. 4 is a detail of the plow lifting device. Fig. 5 is a detail view of the centering device for the plow lifting levers. Fig. 6 is an enlarged view of the levers which regulate the depth of furrow turned by the plows. Fig. 7 is a detail sectional view of the device for varying the depth of cut. Fig. 8 is a view of the steering apparatus lever. Fig. 9 is a detail view of the plow raising device.

Referring now more particularly to the drawings, in the present embodiment of the invention, the vehicle frame 11 is provided adjacent its center with the laterally projecting drive wheels 12 and at the ends thereof with the pilot wheels 13. This frame 11 is preferably formed in two parts, one of which is pivotally mounted at 14 to the other, the drive wheels 12 being mounted at or near this pivotal mounting 14.

Above the vehicle frame is an engine frame 15 which is supported by the vehicle frame and spaced therefrom by the links 16. These links are secured to the frames in such a manner that they will allow a relative parallel movement between the two. On the engine frame are the bars 17 which are adapted to support an engine 18 preferably of the internal combustion type and having a fly wheel 18', but which obviously may be of any desired or suitable character. The engine is provided with a shaft 19 directly driven thereby and having a driving sprocket 20 and a driving gear 21. The sprocket 20 is connected by means of a chain 21' to the sprocket 22 freely mounted on the counter-shaft 23. The gear 21 engages a gear 24, preferably of the same size, which is mounted on a shaft 25, which has also a sprocket 26 secured thereto. This sprocket 26 is connected by the chain 27 to the sprocket wheel 28 also mounted on the counter-shaft 23. Between the two sprocket wheels 22 and 28 is a clutching device 29 operable by a bell crank 30. A sprocket 31 is mounted on this counter shaft 23 and is connected by means of a chain 32 to a driving sprocket 33, and a gearing 34 provides means for transmission of power from sprocket wheel 33 to the drive wheels 12. This gearing may be of any desired kind, either differential or spur gearing being contemplated in the present embodiment.

To space the counter shaft 23 the radius rods 35 are provided, which extend from the shaft 23 to the main driving shaft of the drive wheels 12, the counter shaft 23 being adjustably mounted in the frame 15 by means of the slots 15'. A turn buckle 36 is provided with right and left threads to vary the distance between the two shafts and to tighten or loosen the driving chains as may be desired.

Pilot wheels 13 at the ends of the vehicle frame are provided with bearings 37 which are mounted in a circular frame 38 adapting the pilot wheel and the bearing to be rotated as a whole in a plane parallel with the plane of the vehicle frame. Any suitable means may be employed for rotating the pilot wheels to start the vehicle, a simple and efficient means being now set forth. Attached to the pilot wheel bearing frames are rods 39 and 40, which extend toward the center of the frame and are pivotally secured to opposite ends of a lever 41. This lever 41 is rocked by a shaft 42 and the shaft 42 has a bearing member 43 secured by a pin 44 which secures one of the spacing bars 16 to the vehicle frame. This shaft 42 extends upwardly through the engine frame 15 and is mounted in a standard or frame 45 secured to the engine frame, having at its upper end a bevel gear wheel 46 and being provided intermediate the ends thereof with a flexible joint 47. A longitudinally extending shaft 48 is provided at its ends with steering wheels 49 and has a bevel gear 50 meshing with the gear 46. At the ends of the engine frame 15 are mounted spring seats 51 in such position as to enable an operator to grasp the steering wheels 49 as well as the various levers necessary to the operation of the device, hereinafter described.

The operation of the plow in either direction is effected by the movement of a lever 52 mounted upon the engine frame 15 and in reach of an operator in the seat 51. Connected to the lever 52 is a rod 53, which is in turn connected to one end of the bell crank 30. The movement of one of the levers 52 will cause the clutch 29 to be applied in the corresponding direction to effect the forward or reverse movement of the vehicle.

At one side of the vehicle are arranged depending bars 54 which extend on both sides of one of the drive wheels. In the bar 54 are the pins 55 on which a slotted member 56 is adapted to be moved up or down. U-shaped members 57 are fastened in these slotted members 56 and extend around the drive wheel. At their outer end they are provided with plates 58 bolted above and below the member to form a slot and in this slot the beams 59 of a number of joined plows extend. These beams are secured to the U-shaped member by means of a bolt 60 which allows a lateral swinging movement of the plows in either direction but the plates prevent an upward or downward movement of the plows and also prevent them from overturning. To move the plows up or down a rod 61 is attached to the member 56 and extends upwardly to engage with a lever arm 62 shown more clearly in Figs. 6 and 7. This lever arm 62 is attached to a rod 63 which is mounted in an upwardly projecting bearing mount 64 and at the other end of the rod is a corresponding lever arm 65 which extends downwardly inside of the drive wheel and engages a slotted member on the inside of the wheel to raise or lower the inside portion of the U-shaped member 57. Another rod 66 extends downwardly to engage the other outside slotted member 56 and is connected to a lever arm 67. This lever arm 67 is secured to a sleeve 68 rotatably mounted upon the rod 63, and another lever arm 69 is secured to the inner end of the sleeve 68. A lever 70 is secured to the sleeve 68 and is preferably formed integral with one of the lever arms, as 69, and is provided with a spring pressed dog 71 which engages with the teeth 72 in the upwardly extending plate 64 which forms a bearing support for the rod 63. This lever 70 is provided with a rod 74 attached to the spring pressed dog 71 and extending to a hand-clamp 75 which is pivotally mounted adjacent the end of the said lever and which is adapted to be grasped by the hand of the operator when he desires to disengage the dog 71. Another lever 76 is secured to the rod 63 and is preferably formed integral with one of the lever arms, as 65, extending toward the other seat in a position to be grasped by the operator in the other seat. This lever is provided with a locking dog 77 and a hand-clamp 78 similar to that shown and described in connection with the other lever 70. Apertures 73 are provided in the bearing member 64 which are adapted to receive pins to limit the movement of levers 70 and 76.

To effect the raising or lowering of one set of plows there is provided a sprocket wheel 79 mounted on a shaft 80 which is in turn mounted in the bearing mount 64. This shaft 80 extends inwardly and is provided at its inner end with a gear wheel 81. Referring now to Fig. 4 the position of this gear wheel 81 is more clearly shown. An inclined shaft 82 is mounted in the engine frame 15 and the frame 45 supported thereby and carries a worm gear wheel 83 in engagement with the gear wheel 81. The motor drive gear 21 is provided with a beveled friction gear 84 and on the shaft 82 are mounted beveled friction gears 85 and 86 which are adapted to be moved in engagement with the bevel gear 84. The distance apart of these two gears 85 and 86 is su n that only one of them is in contact with t ie driving bevel gear 84 at one time. Intermediate of the bevel gears 85 and 86 is an annular shoulder or depression 87 (see Fig. 9) into which the projections 88 and 89 are adapted to extend. A lug 90 is secured to the engine frame 15 and lever arms 91 and 92 are mounted on the pivot in this lug 90. An extended portion of the lug 90 is provided with depressions or grooves 94 (Fig. 5) in which projections 95 from the lever arms 91 and 92 are adapted to extend, the sides of the groove being beveled in such a manner that the lever arms are centered thereby. The projections 95 slide only on the beveled edges of the grooves 94 and the resiliency of the levers 91, 92 and the projecting portion of the lug 90 is sufficient to permit the projections 95 to ride up on the beveled sides of grooves 94 and to center the levers when released from an out of center position. Referring now to Fig. 9 an arm 95 is shown projecting from one of the lever arms 92 extending around the inclined shaft 82 and forming a support for the projection 89 above referred to. Referring again more particularly to Figs. 1, 2 and 3, the position of the sprocket wheel 79 on the shaft 80 is more clearly shown. A sprocket chain 96 passes over this sprocket wheel and the ends thereof are attached to cross pieces 97 which are adapted to space the plows of the respective plow sets on either side of the drive wheel 12. The raising of one of the gangs or sets of plows is effected by a movement of the lever 91 or 92 in the proper direction, the operator holding the lever in position while the plow is being raised. On the chain 96 are extending lugs or projections 98 which are adapted to engage lugs 99 on the levers 91 and 92. When the plows have been raised to a predetermined position one of the projections 98 will engage the corresponding lug 99 and will cause the lever to be centered regardless of the wish of the operator.

When the plow comes to the end of the furrow in a field, it is evident that there will be a space substantially the length of the machine which the rear plow in the direction of movement will not reach. By raising the rear plow and lowering the forward plow and then changing the direction of motion, this space may be plowed. Under these circumstances, it is more convenient for an operator on the seat to control the depth of cut of the opposite plow. For this reason the levers 70, 76 control the depth of cut of the opposite plows.

It will be seen that this apparatus may be controlled from either end of the frame and is adapted to be operated in either direction. When it is desired to change the direction of motion of the vehicle, the plows may be readily withdrawn from the furrow and the other set of plows is in readiness for the reverse motion of the vehicle. Thus it will not be necessary to turn the machine around, and it may be run close to the edge of the field without leaving a wide unplowed portion.

It will be noted that the machine readily adapts itself to uneven ground and that the depth of the furrow will not be greatly affected by the unevenness thereof and that the depth of furrow may be varied at will by the operator on the seat without stopping the machine.

What is claimed as new is—

1. In a motor plow, the combination of a vehicle frame, an engine frame and engine mounted thereon, plows secured to the vehicle, a shaft obliquely disposed in the engine frame, bevel gears to rotate the shaft, means in connection with the shaft to lift the plows in a vertical plane, levers to engage the bevel gears, and means automatically to center the levers and disengage the gears.

2. In a motor plow, the combination of a vehicle frame, an engine frame and engine mounted thereon, plows secured to the vehicle, a shaft obliquely disposed in the engine frame, bevel gears to rotate the shaft, a chain secured to the plows with operative connection to the shaft and operable to raise the plows, levers at either end of the vehicle to engage the bevel gears, said levers being centered to release the gears automatically, and means forcibly to center the levers when either plow or set of plows is raised a predetermined amount.

In testimony whereof I have signed my name to this specification, in the presence of two subscribing witnesses, on this 19th day of January A. D. 1911.

EDDY T. McKAIG.

Witnesses:
NINA J. HALSNE,
K. W. WORMELL.